United States Patent
Lu et al.

(10) Patent No.: US 10,633,514 B2
(45) Date of Patent: *Apr. 28, 2020

(54) COMPOSITION OF PBAT RESIN

(71) Applicant: KINGFA SCI. & TECH. CO., LTD., Guangzhou (CN)

(72) Inventors: Changli Lu, Guangzhou (CN); Zhimin Yuan, Guangzhou (CN); Tongmin Cai, Guangzhou (CN); Xianbo Huang, Guangzhou (CN); Xiangbin Zeng, Guangzhou (CN); Jian Jiao, Guangzhou (CN); Renxu Yuan, Guangzhou (CN); Yuke Zhong, Guangzhou (CN); Kai Xiong, Guangzhou (CN); Hui Yang, Guangzhou (CN); Kaijin Mai, Guangzhou (CN); Xueteng Dong, Guangzhou (CN)

(73) Assignee: KINGFA SCI. & TECH. CO., LTD., Guangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/771,262

(22) PCT Filed: Aug. 30, 2016

(86) PCT No.: PCT/CN2016/097345
§ 371 (c)(1),
(2) Date: Apr. 27, 2018

(87) PCT Pub. No.: WO2017/152597
PCT Pub. Date: Sep. 14, 2017

(65) Prior Publication Data
US 2018/0362729 A1 Dec. 20, 2018

(30) Foreign Application Priority Data
Mar. 7, 2016 (CN) .......................... 2016 1 0130991

(51) Int. Cl.
*C08G 63/183* (2006.01)
*C08L 67/02* (2006.01)
*C08K 5/156* (2006.01)

(52) U.S. Cl.
CPC ............ *C08K 5/156* (2013.01); *C08G 63/183* (2013.01); *C08L 67/02* (2013.01)

(58) Field of Classification Search
CPC ......... C08L 67/02; C08K 5/156; C07C 67/08; C08G 63/183
See application file for complete search history.

(56) References Cited

U.S. PATENT DOCUMENTS

| | | | | |
|---|---|---|---|---|
| 3,888,817 A | * | 6/1975 | Georgoudis | C08K 5/109 524/108 |
| 9,896,539 B2 | * | 2/2018 | Li | C08G 63/80 |
| 10,385,204 B2 | * | 8/2019 | Lu | C08K 3/26 |
| 2007/0037912 A1 | | 2/2007 | Mohanty et al. | |
| 2011/0046281 A1 | * | 2/2011 | Scheer | C08L 67/04 524/210 |
| 2018/0163044 A1 | * | 6/2018 | Lu | C08K 5/07 |
| 2018/0171136 A1 | * | 6/2018 | Lu | C08K 5/156 |
| 2018/0215866 A1 | * | 8/2018 | Zhao | C08K 3/08 |

FOREIGN PATENT DOCUMENTS

| | | | | |
|---|---|---|---|---|
| CN | 102485765 A | * | 6/2012 | .......... C08G 63/183 |
| CN | 104672825 | | 6/2015 | |
| CN | 104725616 A | * | 6/2015 | .......... C08G 63/183 |
| CN | 105585824 | | 5/2016 | |
| CN | 105585825 | | 5/2016 | |
| CN | 105585827 | | 5/2016 | |
| CN | 105602209 | | 5/2016 | |

OTHER PUBLICATIONS

CN 102485765 A (dated Jun. 6, 2012) Zhao, D. et al.; machine translation.*
International Search Report for PCT/CN2016/097345, dated Nov. 14, 2016.

* cited by examiner

*Primary Examiner* — Rip A Lee
(74) *Attorney, Agent, or Firm* — Lucas & Mercanti, LLP

(57) ABSTRACT

The present invention discloses a PBAT resin composition comprising: (a) Poly (butyleneadipate-co-terephthalate); (b) a cyclic esterified product having a structure represented by the formula (I)

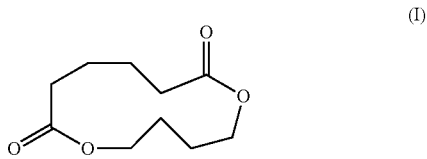

(I)

Wherein the content by weight of the cyclic esterified product is from 10 ppm to 2000 ppm, based on the total weight of the PBAT resin composition. In the present invention, the service life of the PBAT resin composition can be greatly extended by adding cyclic esterified product in the PBAT resin composition and controlling the content of the cyclic esterified product in the composition in the range of 10 ppm to 2000 ppm. And after boiled for 240 hours in 95% ethanol at 40° C., the film produced from blowing or the articles produced from injection have less surface precipitates, with excellent surface appearance properties.

8 Claims, No Drawings

COMPOSITION OF PBAT RESIN

TECHNICAL FIELD

The present invention relates to the technical field of polymer materials, in particular to a composition of PBAT resin having a long service life and excellent surface appearance property.

BACKGROUND TECHNIQUE

Poly (butyleneadipate-co-terephthalate) (PBAT) is a copolymer of butanediol adipate and butylene terephthalate, with characteristics of both PBA and PBT. For the flexible aliphatic chain and rigid aromatic chain contained in it, poly (butyleneadipate-co-terephthalate) (PBAT) has high toughness and high temperature resistance; and because of the presence of ester bonds, it has biodegradability too, being one of the most active materials for biodegradable plastics research and the best degradable materials for market application.

However, during storage and use, the molded articles obtained from PBAT resin are prone to degradation due to the action of microorganisms, light, radiation, air and the environment of the contact, thereby greatly affected the service life.

In addition, under the 95% ethanol boiling condition, the molded articles obtained from the PBAT resin will have something precipitated on the surface of the film or the article, thereby affecting the surface appearance of the film or article.

It has been surprisingly found with the present invention that the service life of the PBAT resin composition can be greatly extended by adding a minute amount of cyclic esterified product in the PBAT resin composition, and excellent surface appearance properties of the PBAT resin composition can be maintained.

SUMMARY OF THE INVENTION

The purpose of the present invention is to provide a PBAT resin composition which allows the PBAT resin composition prepared having a long service life and an excellent surface appearance performance by adding a small amount of cyclic esterified product to the composition.

The present invention is achieved by the following technical solutions:
A PBAT resin composition characterized by comprising the following components:
(a) Poly (butyleneadipate-co-terephthalate);
(b) a cyclic esterified product having a structure represented by the formula (I)

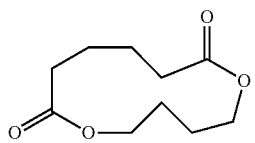

(I)

Wherein the content by weight of the cyclic esterified product is from 10 ppm to 2000 ppm, based on the total weight of the PBAT resin composition.

The content by weight of the cyclic esterified product of the present invention is measured by the following method:

Weigh accurately 1.2000 g of the PBAT resin composition, put it into a 25 ml volumetric flask, dissolve it by chloroform, dilute it to 25 ml after the PBAT resin composition is completely dissolved, measure the peak area of the cyclic esterified product in the above solution by GC-MS, calculate the content of the cyclic esterified product in the PBAT resin composition according to the peak area of the cyclic esterified product and the cyclic esterification standard curve, which may be calibrated by the cyclic esterified product/chloroform solution.

The poly (butyleneadipate-co-terephthalate) (PBAT) resin of the present invention is a copolymer of butylene adipate and butylene terephthalate. The addition of the cyclic esterified product contributes to prolonging the service life of the PBAT resin composition, but if the content of the cyclic esterified product in the PBAT resin composition is too high, the cyclic esterified product may be precipitated on the surface of the film or the article, affecting the surface appearance performance of the film or the article. In the present invention, the research shows that controlling the content of the cyclic esterified product in the PBAT resin composition within the range of 10 ppm to 2000 ppm can ensure not only a long service life of the PBAT resin composition, but also the excellent surface appearance properties of the obtained film or the article. The content by weight of the cyclic esterified product is preferably from 80 ppm to 1250 ppm, more preferably from 180 ppm to 850 ppm based on the total weight of the PBAT resin composition.

The poly (butyleneadipate-co-terephthalate) (PBAT) resin of the present invention can be synthesized by methods common in the art. For example, by the following steps:
React 1,4-butanediol with terephthalic acid at 240° C.-260° C. for 2-5 hours, add to it adipic acid to start esterification reaction at 240° C.-260° C. for 2-5 hours, and finally add to it catalyst and the stabilizer to proceed to polycondensation reaction at 240° C.-260° C. for 3-5 hours, wherein the molar ratio of the 1,4-butanediol to the terephthalic acid is 3-5:1.

Wherein the content by weight T % of the butylene terephthalate unit in the poly (butyleneadipate-co-terephthalate) (PBAT) resin is 35 wt % to 65 wt %. When the T % is less than 35% by weight, the resulting article is too soft and unfavorable to use. When the T % is more than 65% by weight, the product is too hard to be used.

Wherein the melt index of the poly (butyleneadipate-co-terephthalate) (PBAT) resin is in the range of 8 g/10 min to 25 g/10 min at a temperature of 190° C. and a load of 5 kg in accordance with GB/T 3682-2000 standard. Melt index below 8 g/10 min leads to high energy consumption in the process, failing to make full use of molding equipment capacity. Melt index higher than 25 g/10 min leads to unstable product processing.

The cyclic esterified product of the present invention can be acquired by directly adding a cyclic esterified product to it during the blending extrusion of the PBAT resin composition.

The PBAT resin composition of the present invention may further include other adjuvants, such as antioxidants, light stabilizers, impact modifiers, flame retardants, optical brighteners, lubricants, plasticizers, antistatic agents, mold release agents, pigments and the like depending on the actual applications. The amount of the other adjuvants may be 0 to 10 parts by weight, as necessary, based on 100 parts by weight of the PBAT resin.

The antioxidant is selected from one or more of hindered amine antioxidant, hindered phenol antioxidant and phosphite antioxidant, and specific examples thereof include 1010, 168, 1076, 445, 1098 or a mixture of two or more thereof;

The light stabilizer is a hindered amine light stabilizer, and specifically includes one or more of UV-944, UV-234, 770DF, 328, and 531, and mixtures of two or more thereof;

Wherein the impact modifier is one kind or a mixture of PTW, styrene-ethylene/butylene-styrene block copolymer SEBS;

Wherein the flame retardant is one of red phosphorus, OP1240 and OP1230 or a mixture of two or more thereof;

The fluorescent whitening agent is one kind or a mixture of bistriazine aminostilbene and titanium white powder;

Wherein the lubricant is one kind of or a mixture of two or more of talcum powder, ethylene bisstearamide EBS, erucic amide, zinc stearate and silicone oil;

Wherein the plasticizer is one kind of or a mixture of two or more of glycerin, citric acid, butyl citrate, epoxy soybean oil and the like;

The antistatic agent is a permanent antistatic agent, and specific examples thereof include one or more of PELESTAT-230, PELESTAT-6500 and SUNNICO ASA-2500, and mixtures of two or more thereof;

Wherein the mold release agent is one kind of or a mixture of two or more of silicone oil, paraffin wax, white mineral oil and petrolatum;

Wherein the pigment is one kind or a mixture of two or more of carbon black, black, titanium white, zinc sulfide, phthalocyanine blue and fluorescent orange.

The PBAT resin composition of the present invention can be used for the preparation of shopping bags, compost bags, mulch films, protective covering films, silo films, film tapes, fabrics, nonwovens, textiles, fishing nets, load bags and garbage bags etc.

Compared with the prior art, the invention has the following beneficial effects: The present can greatly extend the service life of the PBAT resin composition by adding the cyclic esterified product to the composition and controlling the content of the cyclic esterified product in the composition in the range of 10 ppm to 2000 ppm. And after boiled with 95% ethanol at 40° C. for 240 h, the film produced from blowing or the articles produced from injection have less surface precipitates, with excellent surface appearance properties.

EMBODIMENTS

The present invention is further illustrated by the following specific examples. The following examples are preferred embodiments of the present invention, but the embodiments of the present invention are not limited to the following examples.

The cyclic esterified products, antioxidants 1010 and erucamide used in the present invention are all commercially available.

Synthesis Method of PBAT Resin:

The measured terephthalic acid and 1,4-butanediol are put into a reaction kettle, and the temperature is raised to 240° C.-260° C. with prior replacement by nitrogen. After reaction for 2-4 hours, adipic acid is added and the temperature is raised to 240° C.-260° C. The reaction is continued for 2-4 hours, appropriate amount of catalyst and stabilizer are added to it to reduce the pressure in the reactor to below 50 Pa within 30 min, the reaction is continued for 2-5 hours at 240° C.-260° C., stirring is stopped and the reactor is filled with high purity nitrogen, the resin is driven out from the reactor, granulated into PBAT resin. PBAT resin with different content of butylene terephthalate unit can be obtained depending on the charge amount of terephthalic acid and adipic acid.

Wherein the content of the butylene terephthalate unit is determined by $^1$H NMR test, using deuterated chloroform as the solvent, and TMS as the internal standard, and the results are calculated according to the following formula:

$$T\% = \frac{220*S_{8.1}}{220*S_{8.1} + 200*S_{2.3}} *100\%$$

Wherein: T % is the content of the butylene terephthalate unit;

$S_8$ is the absorption peak area at 8.1 ppm in $^1$H NMR spectrum;

$S_{2.3}$ is the absorption peak area at 2.3 ppm in the $^1$H NMR spectrum;

Examples 1-15 and Comparative Examples 1-3

According to the formulation shown in Table 1, PBAT resin, cyclic esterified product, antioxidant 1010, erucic acid amide and other auxiliaries are mixed and put into a single-screw extruder, extruded at 140-240° C., granulated to give the composition. For the performance test data, see Table 1.

Performance Evaluation Method:

(1) Evaluation Method of Service Life of Molded Article:

The molded articles obtained from the PBAT composition are put into a thermo-hygrostat at 60° C. and 60% relative humidity for wet heat aging test, and sampled every other 3 days to test the longitudinal and transverse tear properties of the molded product. When Longitudinal and transverse tear properties are decayed to about 50%, it will reach the half-life of the sample. The shorter half-life, the shorter the service life of the PBAT molded products.

(2) Evaluation Method of Surface Appearance Property of Molded Article:

Place the 2 mm injection color plate in 95% ethanol solution at 95° C., boiled for 240 h, then place it in a standard laboratory with ambient temperature of (23±2) ° C. and relative humidity of 45%-55%, adjust it for 48 h, then measure the L value difference ΔL before and after the treatment of the palette with a colorimeter. The larger the ΔL, the more the surface precipitates and the worse the surface appearance.

(3) Determination Method of Cyclic Esterified Product:

Accurately weigh 1.2000 g PBAT resin composition, put it into a 25 ml volumetric flask and dissolve it with chloroform until the PBAT resin composition is completely dissolved, dilute it to 25 ml. Measure the peak area of the cyclic esterified product in the above solution by GC-MS, calculate the content of the cyclic esterified product of the PBAT resin composition according to the peak area of the cyclic esterified product and the cyclic esterification standard Curve, which may be calibrated by the cyclic esterified product/chloroform solution.

TABLE 1

Test data (by weight) of Comparative Examples (CE)1 to 3 and Embodiment examples 1-15

|  |  | CE 1 | CE 2 | CE3 | Emb 1 | Emb 2 | Emb 3 | Emb 4 | Emb 5 | Emb 6 | Emb 7 |
|---|---|---|---|---|---|---|---|---|---|---|---|
| PBAT | Amount added | 100 | 100 | 100 | 100 | 100 | 100 | 100 | 100 | 100 | 100 |
|  | Melt Index (g/10 min) | 15 | 15 | 15 | 15 | 10 | 8 | 13 | 16 | 18 | 25 |
|  | T % | 50 | 50 | 50 | 50 | 65 | 35 | 40 | 51 | 54 | 55 |
| Cyclic Ester Content (based on total composition)/ppm |  | 0 | 5 | 2320 | 180 | 204 | 320 | 418 | 569 | 740 | 850 |
| Antioxidant 1010 |  | 1.5 | 1.5 | 1.5 | 1.5 | 1.5 | 1.5 | 1.5 | 1.5 | 1.5 | 1.5 |
| Erucic amide |  | 1 | 1 | 1 | 1 | 1 | 1 | 1 | 1 | 1 | 1 |
| Half-life/day |  | 16 | 20 | 32 | 70 | 75 | 80 | 86 | 98 | 101 | 110 |
| ΔL |  | 0.03 | 0.08 | 1.12 | 0.20 | 0.24 | 0.28 | 0.30 | 0.37 | 0.38 | 0.40 |

|  |  | Emb8 | Emb9 | Emb10 | Emb11 | Emb12 | Emb13 | Emb14 | Emb15 |
|---|---|---|---|---|---|---|---|---|---|
| PBAT | Amount added | 100 | 100 | 100 | 100 | 100 | 100 | 100 | 100 |
|  | Melt Index (g/10 min) | 23 | 17 | 14 | 21 | 16 | 12 | 9 | 19 |
|  | T % | 51 | 52 | 53 | 49 | 48 | 59 | 56 | 45 |
| Cyclic Ester Content (based on total composition)/ppm |  | 80 | 95 | 1062 | 1250 | 10 | 20 | 1781 | 2000 |
| Antioxidant 1010 |  | 1.5 | 1.5 | 1.5 | 1.5 | 1.5 | 1.5 | 1.5 | 1.5 |
| Erucic amide |  | 1 | 1 | 1 | 1 | 1 | 1 | 1 | 1 |
| Half-life/day |  | 60 | 62 | 63 | 68 | 52 | 55 | 57 | 58 |
| ΔL |  | 0.45 | 0.42 | 0.47 | 0.50 | 0.52 | 0.55 | 0.56 | 0.60 |

As can be seen in Table 1, PBAT composition with a cyclic esterified product content of 10 to 2000 ppm will have a longer service life, and ΔL≤0.60 after boiled in 95% ethanol at 40° C. for 240 hours, indicating that the composition has excellent surface appearance performance. Whereas comparative example 1 does not contain any cyclic esterified product and the cyclic esterified product content of comparative example 2 is less than 10 ppm, so the composition has a shorter service life, although the ΔL value of the composition is small. In comparative example 3, the content of the cyclic esterified product exceeds 2000 ppm, the ΔL is 1.0 or larger, indicating that the surface appearance of the composition is inferior for more surface precipitates.

The invention claimed is:

1. A PBAT resin composition comprising the following components:
   (a) poly (butyleneadipate-co-terephthalate);
   (b) a cyclic esterified product having a structure represented by the formula (I)

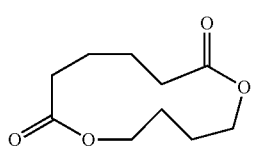

(I)

wherein a content by weight of the cyclic esterified product is from 10 ppm to 2000 ppm, based on a total weight of the PBAT resin composition.

2. A PBAT resin composition according to claim 1, wherein the content by weight of the cyclic esterified product is measured by the following method: weigh accurately 1.2000 g of the PBAT resin composition, put it into a 25 ml volumetric flask, dissolve it by chloroform, dilute it to 25 ml after the PBAT resin composition is completely dissolved, measure the peak area of the cyclic esterified product in the above solution by GC-MS, calculate the content of the cyclic esterified product of the PBAT resin composition according to the peak area of the cyclic esterified product and the cyclic esterification standard curve, which may be calibrated by the cyclic esterified product/chloroform solution.

3. A PBAT resin composition according to claim 1, wherein the content by weight of the cyclic esterified product is from 80 ppm to 1250 ppm, or from 180 ppm to 850 ppm, based on the total weight of the PBAT resin composition.

4. A PBAT resin composition according to claim 1, wherein a content by weight T % of the butylene terephthalate unit in the poly (butyleneadipate-co-terephthalate) is 35 wt % to 65 wt %.

5. A PBAT resin composition according to claim 1, wherein a melt index of the poly (butyleneadipate-co-terephthalate) resin is in a range of 8 g/10 min to 25 g/10 min at a temperature of 190° C. and a load of 5 kg in accordance with GB/T 3682-2000 standard.

6. A PBAT resin composition according to claim 1, wherein the PBAT resin composition further comprises other adjuvants which are one or more of antioxidants, light stabilizers, impact modifiers, flame retardant, fluorescent whitening agent, lubricant, plasticizer, antistatic agent, mold release agent, or pigment.

7. A PBAT resin composition according to claim 1, wherein the PBAT resin has a half-life of more than 50 days after hot and humid aging at a temperature of 60° C. and humidity of 60% in a box with a constant temperature and a constant humidity.

8. A PBAT resin composition according to claim 1, wherein the PBAT resin composition has a ΔL value≤0.60 after boiled for 240 hours in 95% ethanol at 40° C.

* * * * *